July 30, 1968   W. B. BRIDGES   3,395,364
IONIZED NOBLE GAS LASER

Filed May 6, 1964   2 Sheets-Sheet 1

INVENTOR.
WILLIAM B. BRIDGES,
By J. K. Haskell
ATTORNEY.

July 30, 1968  W. B. BRIDGES  3,395,364
IONIZED NOBLE GAS LASER

Filed May 6, 1964  2 Sheets-Sheet 2

INVENTOR.
WILLIAM B. BRIDGES,
BY J. K. Haskell
ATTORNEY.

3,395,364
IONIZED NOBLE GAS LASER
William B. Bridges, Thousand Oaks, Calif., assignor to Hughes Aircraft Company, Culver City, Calif., a corporation of Delaware
Filed May 6, 1964, Ser. No. 365,259
6 Claims. (Cl. 331—94.5)

ABSTRACT OF THE DISCLOSURE

This is a gas laser wherein a noble gas is disposed in a gas chamber at least a portion of which is in turn disposed in a resonant cavity for supporting resonance of electromagnetic energy in a desired portion of the electromagnetic spectrum. The noble gas is pumped to induce transitions to a desired one of a plurality of excited levels in a selected ionized state whereby radiative transitions occur between the desired level and a lower level in the same ionized state.

---

This invention relates to a laser and more particularly to a gas laser capable of radiating electromagnetic energy throughout the visible and invisible light spectrum.

In the summer of 1960, the first operational laser was reported by Dr. T. H. Maiman in an article entitled "Optical Maser Action in Ruby," Nature, 137, page 493. Laser action was obtained while experimenting with a specially doped ruby as a possible material capable of supporting laser action. The device produced short pulses of red light at 6,943 angstroms (A.) Since that time laser action has been supported in many different materials in the solid, liquid and gaseous state. However, in the two years following Dr. Maiman's discovery the output frequency of lasers was limited to the infrared and near-infrared region of the visible electromagnetic spectrum.

In view of the fact that most of the present-day photoemissive devices are far more sensitive in the near-ultraviolet, green and blue region of the light spectrum than in the red and infrared region, a laser capable of providing coherent light in this heretofore vacant region would be highly desirable.

Also, another important use for additional laser frequencies would be in the optical communications field where many more channels of communications would thus be available.

In 1962, the fact that a helium-neon laser was made to emit a C-W beam of visible red light (0.6328 microns or 6,328 A.) was reported by A. D. White and J. D. Rigden in Proceedings of the IRE, Volume 50, page 7. To that date, this helium-neon gas laser produced the highest frequency coherent energy in the visible range ever reported.

However, in the Jan. 15, 1964 issue of Applied Physics Letters, Volume 4, Number 2, W. E. Bell, in an article entiled "Visible Laser Transitions in Hg+," disclosed that laser action was observed at two visible wavelengths in a mercury-helium laser. The two observed wavelengths were as 6,150 A. and 5,678 A., respectively. As reported by W. E. Bell, continuous oscillation from neutral mercury in the infrared has been reported previously (Nature, Volume 198, page 774, May 25, 1963) but this was the first time that laser action has been observed from the ionized atom of mercury.

In order to provide additional visible lines from the type of device disclosed by W. E. Bell, one logically would try other lasable material closely related to mercury, such as cadmium or zinc. This approach has a serious drawback in that these materials may not have sufficient vapor pressures at operating temperatures for laser operation and therefore require some type of heating arrangement to increase this pressure.

Contrary to the logical extension of the experiments of Bell, the teachings of the prior art are extended according to the present invention in the utilization of well-known noble gasses such as argon, krypton and xenon, not as heretofore—in their neutral state, but rather in their ionized state, for example $A^+$, $Kr^+$, $Kr^{2+}$ and $Xe^+$. The result is the addition of at least 30 new laser wavelengths in the visible spectrum.

Accordingly, one object of the present invention is to provide an improved laser capable of generating new frequencies of coherent light energy.

Another object of the present invention is to provide a laser capable of generating coherent light energy in the ultraviolet, green and blue region of the electromagnetic spectrum.

Still another object of this invention is to provide a source of coherent light in a region of the light spectrum at which most present-day photoemissive devices such as photomultipliers are most sensitive.

Yet another object of the invention is to provide a coherent light generator which increases the number of frequencies available for optical communications purposes.

These and other objectives are achieved in a laser according to one embodiment of this invention comprising a resonant cavity for supporting resonance of electromagnetic energy in a desired portion of the electromagnetic energy spectrum and a laser gas chamber included within the resonant cavity. The gas chamber and the resonant cavity are provided with portions at least partially transparent to light energy in such a manner to allow the light energy produced within the device to be projected as an output from the device. A noble gaseous element is disposed within the gas chamber (and the resonant cavity) and is pumped to a desired one of a plurality of excited levels in a selected ionized state whereby radiative transitions occur between the desired level and a lower level in the same ionized state to produce the coherent light energy.

The invention and specific embodiments thereof will be described hereinafter by way of example and with reference to the accompanying drawings, in which.

Figure 1:
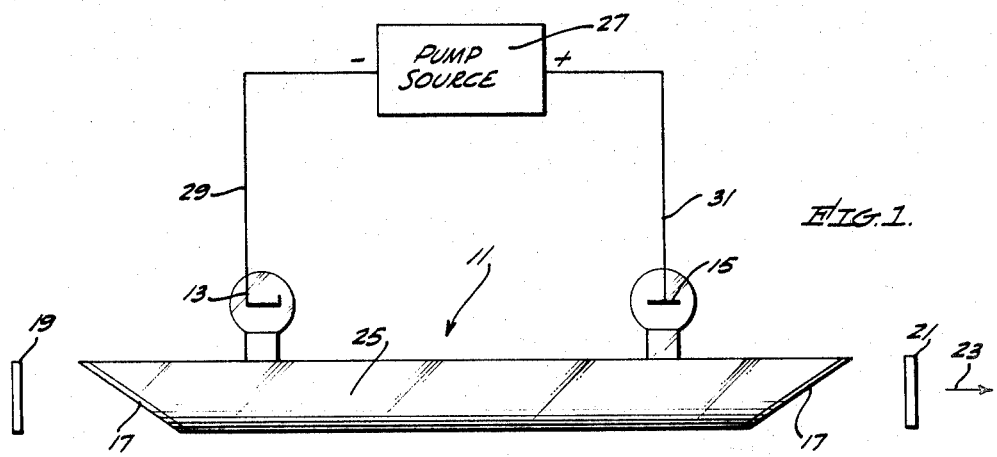
FIG. 1 is a schematic diagram showing the basic features of the present invention.

Referring now to the drawings and more particularly to the gas discharge laser of FIG. 1, there is shown a discharge chamber 11 having mounted therein a cathode 13, an anode 15 and a pair of optical transparent Brewster type windows 17 disposed at either end of the chamber 11. Sealed within the chamber 11 is a noble gaseous lasing material 25 such as argon, krypton, xenon or neon. The discharge chamber 11 is disposed within an optical frequency resonant cavity including a dielectric coated mirror 19 which may or may not be substantially nontransmissive and a partially transmissive dielectric coated mirror 21 through which coherent light energy generated by laser action (represented by arrow 23) is projected. Also shown is a conventional type pump energy source 27 coupled to the cathode 13 and the anode 15 by a cathode lead 29 and an anode lead 31, respectively.

The pump energy source 27 in this example produces energy sufficient to pump the lasing material 25 to its singly-ionized state whereby radiative transitions occur in this region and produce electromagnetic energy in the visible frequency range. The pump energy necessary to achieve the transitions in any of the ionized states varies with the particular element used as the lasing material 25 but will always be of a value above a first ionization potential of the gaseous lasing material 25 (see FIG. 2).

The particular pump energy source 27 shown in FIG. 1 is a pulse type providing a current density approximately 100 to 200 amps/cm.$^2$ and having a pulse width of 0.5 $\mu$sec. to 7 $\mu$sec., a repetition rate of 70 c.p.s. to 2 kc., a maximum current capability of 40 amps and provides a continuously variable voltage of 0–20 kilovolts. A condenser bank pulser giving a single 100 msec. pulse has also been used. Furthermore, a continuous type pump-power source has been substituted for the pulse type shown and continuous laser action obtained.

Figure 2:
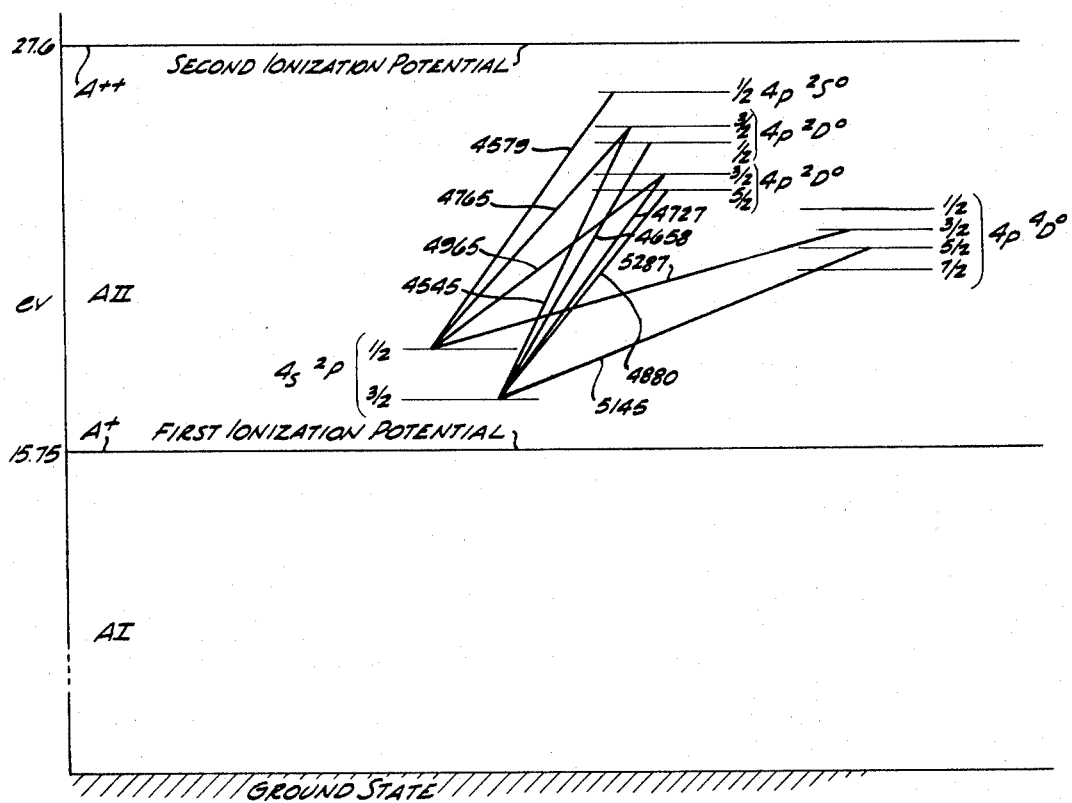
FIG. 2 is an energy level diagram of argon showing nine laser transitions in the A+ region.

FIG. 2 illustrates the radiative transitions in singly-ionized region of the energy level diagram for argon used as the lasing material 25 in the laser of FIG. 1.

Ten new laser wavelengths in the green and blue portions of the visible spectrum have been observed in the argon discharge laser shown in FIG. 1. As seen in FIG. 2 (not drawn to scale), the transitions responsible for these new laser wavelengths occur in the singly-ionized state of the argon atom (AII spectrum). Measured wavelengths, level assignments and a few estimates of gain are given in Table 1.

TABLE 1

| Measured Wavelength (A.) | MIT Wavelength Tables | Level Assingment | Est. Gain Percent | Relative Amplitudes | Mirrors |
|---|---|---|---|---|---|
| 4,545 [a]±1 | 4,545.08 | $4p^2P°_{3/2} \rightarrow 4s^2P_{3/2}$ | >15 | Weak | C |
| 4,579.36±.16 | 4,579.39 | $4p^2S°_{1/2} \rightarrow 4sP^2_{1/2}$ | | Moderate | A, C |
| 4,657.95±.02 | 4,657.94 | $4p^2P°_{1/2} \rightarrow 4s^2P_{3/2}$ | | do | C |
| 4,726.89±.04 | 4,726.91 | $4p^2D°_{3/2} \rightarrow 4s^2P_{3/2}$ | | Weak | C |
| 4,764.88±.04 | 4,764.89 | $4p^2P°_{3/2} \rightarrow 4s^2P_{1/2}$ | | Moderate | A, C |
| 4,879.86±.04 | 4,879.90 | $4p^2D°_{5/2} \rightarrow 4s^2P_{3/2}$ | >15 | Strong [b] | A, B, C |
| 4,965.09±.02 | 4,965.12 | $4p^2D°_{3/2} \rightarrow 4s^2P_{1/2}$ | | Moderate | A, C |
| 5,017.17±.02 | 5,017.16 | $4p'^2F°_{5/2} \rightarrow 3d^2D_{3/2}$ | | Weak | A, C |
| 5,145.33±.02 | 5,145.36 | $4p^4D°_{5/2} \rightarrow 4s^2P_{3/2}$ | >10 | Strong | A, B, C |
| 5,287 [a]±1 | 5,286.92 | $4p^4D°_{3/2} \rightarrow 4s^2P_{3/2}$ | | Weak | A |

[a] Measured with Jarrell-Ash 0.5 m. Ebert scanning spectrometer only.
[b] Very persistent laser action; small traces in almost any other gas will oscillate.

Nine of the lines arise from the $4p \rightarrow 4s$ transitions as shown in FIG. 2. The remaining wavelength fits the $4p'^2F°_{5/2} \rightarrow 3d^2D_{3/2}$ transition.

Wavelengths were measured with a 2 meter, dual grating Bausch and Lomb spectrograph, with a 4 A./mm. dispersion, except for the lines 5,287 A. and 4,545 A., which were measured with a 0.5 meter Jarrell-Ash scanning monochrometer.

The characteristics of the discharge tube or chamber 11 and the mirrors 19 and 21 used in these experiments are given in Table 2.

TABLE 2

Discharge tube:
  Diameter—4 mm.
  Material—Fused quartz.
  Cathode—Hot: 120 watt thoriated tungsten. Cold: Molybdenum slug ¾" dia. x ¾" long.
  Length—107 cm. for hot cathode operation, 111 cm. for cold cathode operation.
  Windows—.060" Homosil fused quartz, at Brewster's angle.
Mirrors:
  Type A—487 cm. radius; dielectric coated; centered at 5300 A.; 1% transmission at 5600 A., 4900 A.; 3% transmission at 6000 A., 4600 A.
  Type B—487 cm. radius; aluminized. Estimated reflectivity 90%.
  Type C—487 cm. radius; dielectric coated, centered at 4500 A.; 1% transmission at 5000 A., 4100 A.; 3% transmission at 5100 A., 4000 A.
  Type D—487 cm. radius; dielectric coated, centered at 6700 A.; 1% transmission at 7800 A., 5700 A.

As evident from Table 2, both mirrors 19 and 21 are partially transmissive but for higher output power, mirror 19 may be made substantially nontransmissive.

Oscillation was obtained with neon or helium as a buffer gas and also in pure argon on all wavelengths. Typical pressures were a few m. torr (microns) of argon and 200 m. torr of the buffer gas for pulsed operation, and 200 m. torr of argon for continuous operation. The behavior of the 4,879.90 A. line was found to be unique in that only a very small amount of argon is necessary to produce laser action.

Dielectric coated mirrors 19 and 21, peaked in the green (Type A) and blue (Type C) were used to obtain the ten lines listed in Table 1. Another set of mirrors, covering the green-to-red range (Type D) were used, with no laser lines observed. Cavity loss measurements indicate that the gain of the strongest lines is high, in particular 13 decibels (db) per meter for 4,879.90 A. and 7 db per meter for 4,764.88 A.

It is clear from FIG. 2 that there are other transitions at wavelengths within the range of the mirrors used that did not oscillate but which probably have gains greater than unity. This can be explained from the fact that a relatively short chamber 11 (1 meter long) was used and therefore was insufficient for oscillation.

The total average power measured with a thermopile ranged between 0.2 and 0.5 milliwatts, depending on the gas used. Peak power ranged from 0.4 to 1.0 watt.

Figure 3:
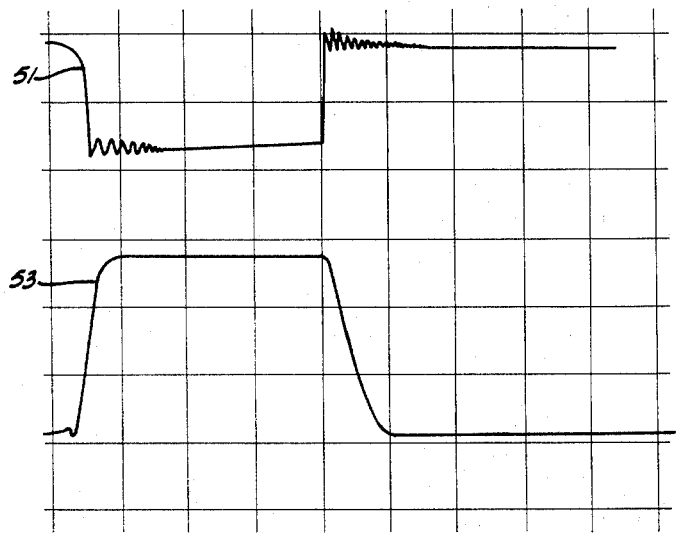
FIG. 3 is a dual trace oscilloscope representation comparing the initiating discharge current pulse (upper trace) with the laser output at 4,879.90 A. (lower trace).

FIG. 3 shows the shape of the exciting current pulse 51 from the pump energy source 27 and the laser output pulse 53 at 4,880 A. The abscissa for both upper and lower traces is 2 $\mu$sec./division. Here, a Jarrell-Ash 0.5 meter monochrometer, with a fast rise time (<2 nsec.) photomultiplier and Tektronix 555 dual beam oscilloscope were used. The laser output appears to start at the leading edge of the current pulse and lasts for the duration of the pulse.

Laser oscillation is also obtainable by using krypton or xenon in the chamber 11. These two elements provide at least 21 additional wavelengths spanning the visible portion of the spectrum. These lines also arise from transitions between excitation levels of the singly-ionized state of the atoms (KrII, XeII spectra).

The wavelengths and level assignments are given in Table 3 for krypton and Table 4 for xenon. The levels shown in these tables are analogous to those shown for argon. The xenon transitions are all $s \rightarrow p$ or $s' \rightarrow p'$, while the krypton transitions are predominantly of this type but include one $p \rightarrow d$ and two $p' \rightarrow d$.

TABLE 3.—KRYPTON LASER TRANSITIONS

| Wavelength | Level Assignment | Relative Amplitude |
|---|---|---|
| 4,577.20 | $5p'^2F°_{7/2} \rightarrow 5s'^2D_{5/2}$ | Weak. |
| 4,619.15 | $5p^2D°_{5/2} \rightarrow 5s'^2P_{3/2}$ | Strong. |
| 4,633.88 | $5p'^2F°_{5/2} \rightarrow 5s'^2D_{3/2}$ | Weak.[a] |
| 4,680.41 | $5p^2S°_{1/2} \rightarrow 5s^2P_{1/2}$ | Moderate. |
| 4,765.74 | $5p^4D°_{5/2} \rightarrow 5s^4P_{3/2}$ | Strong.[b] |
| 4,762.43 | $5p^2D°_{5/2} \rightarrow 5s^2P_{1/2}$ | Do.[b] |
| 4,825.18 | $5p^4S°_{3/2} \rightarrow 5s^2P_{1/2}$ | Moderate. |
| 5,208.32 | $5p^4P°_{3/2} \rightarrow 5s^4P_{3/2}$ | Strong.[b] |
| 5,308.66 | $5p^4P°_{5/2} \rightarrow 5s^4P_{3/2}$ | Weak.[b] |
| 5,681.89 | $5p^4D°_{5/2} \rightarrow 5s^2P_{3/2}$ | Strong. |
| 6,470.89 | $5p^4P°_{5/2} \rightarrow 5s^2P_{3/2}$ | Do.[b] |
| 6,570.07 | $5p'^2D°_{5/2} \rightarrow 4d^2F_{5/2}$ | Weak.[a] |
| 6,764.43 | | Moderate.[b] |
| 6,870.85 | $5p'^2F°_{5/2} \rightarrow 4d^2P_{3/2}$ | Weak.[b] |
| 7,993.22 | $5p^4P°_{3/2} \rightarrow 4d^4D_{1/2}$ | Moderate.[b] |

[a] Optimum pressure of less than $10^{-4}$ torr.
[b] Optimum pressure of the order of 0.010 torr.
All others: Optimum pressure of the order of 0.001 torr.

TABLE 4.—XENON LASER TRANSITIONS

| Wavelength (A.) | Level Assignment |
|---|---|
| 4603.028 | $6p^4D°_{3/2} \rightarrow 6s^4P_{3/2}$ a |
| 5044.92 | $6p'^2P°_{1/2} \rightarrow 6s'^2D_{3/2}$ |
| 5261.95 | $6p'^2D°_{3/2} \rightarrow 6s'^2D_{3/2}$ |
| 5419.15 | $6p^4D°_{5/2} \rightarrow 6s^4P_{3/2}$ a |
| 5971.13 | $6p'^2P°_{3/2} \rightarrow 6s'^2D_{3/2}$ |
| 6270.82 | $6p'^2F°_{5/2} \rightarrow 6s'^2D_{3/2}$ | a Strongest lines.

The laser configuration used in tabulating the above material for krypton and xenon is the same as shown in FIG. 1, with the only change being the substitution of a large oxide cathode for those cathodes described in Table 2. (Laser action in argon was also obtained with this oxide cathode.)

No buffer gas was needed for operation with krypton and xenon. It is possible to obtain simultaneous oscillation on all the lines of argon, krypton and xenon within the range of the mirrors 19 and 31 used when the three gases are present. The estimated gain is greater than 10% per meter for the stronger lines.

Using the gas krypton in the device of FIG. 1 with a pump energy source 27 capable of furnishing approximately 1,000 amperes per square centimeter the gas krypton has been lased at the third ionization level. In this operation a few of the following frequencies have been observed:

4067.37
4131.33
4154.46
4171.81
4226.51

Although the preceding frequencies obtained have been shown to be in the singly-ionized and doubly-ionized states, it should be evident that many additional frequencies will be available by pumping the lasing material 25 to even higher energy states.

Furthermore, two additional frequencies in the ultraviolet region have been observed utilizing neon as the lasing material 25. These frequencies are 3,322, or make approximately 3,322 A. and 3,376 A., respectively.

In achieving this type of laser action the pump energy was in the region of 1,000 amperes per centimeter square.

From the foregoing it will be seen that the generation of coherent light energy in the green and blue region of the visible electromagnetic energy spectrum is achieved in a laser utilizing argon, krypton, neon or xenon as the lasing material when any of these elements is pumped with sufficient energy to cause radiative transitions to occur in any of the elements ionized states.

Although a specific embodiment has been herein illustrated, it will be appreciated that other organizations of the specific arrangement shown may be made within the spirit and scope of the invention. For example, other types of pumping methods may be employed and different chamber and resonant cavity configurations may be utilized in practicing the invention.

Accordingly, it is intended that the foregoing disclosure and the showings made in the drawings shall be considered only as illustrations of the principles of this invention and are not to be construed in a limiting sense.

What is claimed is:

1. A gas laser, comprising:
   a gas chamber;
   resonant cavity means including at least a portion of said gas chamber for supporting resonance of electromagnetic energy in a desired portion of the electromagnetic spectrum, said resonant cavity having means for transmitting as an output at least a portion of the electromagnetic energy supported by said resonant cavity means;
   a noble gas disposed within said gas chamber and said resonant cavity means; and
   pump means coupled to said noble gas for pumping said noble gas to induce transitions to a desired one of a plurality of excited levels in a selected ionized state whereby radiative transitions occur between said desired level and a lower level in the same ionized state.

2. A gas laser according to claim 1, wherein said pump means includes an electromagnetic pump source.

3. A gas laser according to claim 1, wherein said pump means includes a continuous wave electronic source.

4. A gas laser according to claim 1, wherein said pump means includes a pulse type pump energy source.

5. A gas laser according to claim 1, wherein said noble gas comprises a plurality of gaseous elements.

6. A gas laser according to claim 1, wherein said selected ionized state is a multiple-ionized state.

References Cited

UNITED STATES PATENTS

| 3,242,439 | 3/1966 | Rigden et al. | 331—94.5 |
| 3,164,781 | 1/1965 | Goldberg | 331—94.5 |
| 3,159,707 | 12/1964 | Bennett et al. | 331—94.5 |
| 3,183,937 | 5/1965 | Earley et al. | 331—94.5 |

OTHER REFERENCES

Off the shelf components for optical masers, Aug. 4, 1961, Electronics, pp. 62–63.

JEWELL H. PEDERSON, *Primary Examiner.*

B. LACOMIS, *Assistant Examiner.*